(12) United States Patent
Feilner et al.

(10) Patent No.: US 6,463,263 B1
(45) Date of Patent: Oct. 8, 2002

(54) COMMUNICATION STATION

(75) Inventors: Werner Feilner, Lauf; Ricarda Klauss, Berg; Ernst Macher, Nürnberg; Bernd Möller, Burgthann; Karl-Heinz Rademacher, Schwarzenbruck; Armin Reichert, Nürnberg; Markus Stark, Waizendorf; Detlef Petruschke; Markus Fuchs, both of Nürnberg, all of (DE)

(73) Assignee: Telefonaktiebolaget LM Ericsson (publ) (SE)

(*) Notice: Subject to any disclaimer, the term of this patent is extended or adjusted under 35 U.S.C. 154(b) by 0 days.

(21) Appl. No.: 09/493,608

(22) Filed: Jan. 28, 2000

(30) Foreign Application Priority Data

Feb. 1, 1999 (EP) .............................. 99102036

(51) Int. Cl.⁷ ................................. H04B 1/38
(52) U.S. Cl. .................. 455/90; 455/348; 455/349; 455/550
(58) Field of Search .................. 455/90, 348, 349, 455/347, 350, 550, 351; 379/433.01, 433.02–433.09, 433.11, 440; 439/630

(56) References Cited

U.S. PATENT DOCUMENTS

| 3,600,528 | A | | 8/1971 | Leposavic |
| 4,912,602 | A | * | 3/1990 | Zurek et al. .................. 455/90 |
| 5,146,615 | A | | 9/1992 | Hodsdon et al. |
| 5,271,056 | A | | 12/1993 | Pesola et al. |
| 5,768,370 | A | | 6/1998 | Maatta et al. |
| 5,819,163 | A | | 10/1998 | Tsukamoto et al. |
| 6,101,372 | A | * | 8/2000 | Kubo .......................... 455/90 |

FOREIGN PATENT DOCUMENTS

| EP | 0 727 932 A2 | 8/1996 |
| GB | 2 107 523 A | 4/1983 |
| WO | 97/32423 | 9/1997 |
| WO | 98/20622 | 5/1998 |
| WO | 99/13626 | 3/1999 |

* cited by examiner

*Primary Examiner*—Lee Nguyen
(74) *Attorney, Agent, or Firm*—Burns, Doane, Swecker & Mathis, L.L.P.

(57) ABSTRACT

The present invention relates to a communication station (MT; FIGS. 1, 2; FIGS. 3, 4) including a power supply unit (6, 6', 6"), a core unit (1) connectable to the power supply unit (6, 6', 6") and constituted by a mechanically rigid assembly (9-14, 15-1, 15-2, 16-20) of all other electrical units of the communication station except for the power supply unit, and a shell unit (2-6) which houses the core unit (1) and comprises no electrical units of ther communication station. Front and back housings of the shell unit can be exchanged easily, since no electrical connections are necessary to the core unit during the exchange. Thus, differently shaped communication stations can be easily achieved from a variety of differently shaped housings.

25 Claims, 7 Drawing Sheets

COMMUNICATION STATION

This application claims priority under 35 U.S.C. §§119 and/or 365 to 99102036.3 filed in Europe on Feb. 1, 1999; the entire content of which is hereby incorporated by reference.

FIELD OF THE INVENTION

The present invention relates to communication station, e.g. a mobile station and in particular to a mobile telephone used for performing speech and data communication in a mobile radio communication network. The mobile radio communication network, in which said mobile station or telephone can be used, can e.g. be constituted by a GSM-network. The mobile station or telephone can also belong to a mobile communication network used at home or in an office allowing a free movement of the user. In particular, the invention relates to the construction of the mobile station, i.e. a mobile telephone allowing the use of the same functionalities with a plurality of different designs for the housing. The invention can be applied to all mobile communication units, e.g. mobile stations including mobile telephones and cordless telephones (e.g. DECT), and also other communication stations, e.g. fixed network cable telephone units.

BACKGROUND OF THE INVENTION

A mobile station or telephone with which speech and/or data communications can be carried out in a mobile radio communication network typically comprises a power supply unit, an electronic circuit board, on which the electronic components and chips are mounted, which are necessary for providing functions of the mobile telephone, a microphone unit, a loudspeaker unit, a keypad unit, a display unit, an antenna unit, a shielding unit and a card reader unit. Furthermore, there may be provided light emitting diodes (LEDs) which are used for indicating a stand-by operation mode or other operation modes of the mobile telephone and which are also used for illumination e.g. of the keypad. The mobile telephone also comprises a socket which can be connected with a charging device in order to charge a battery of the power supply unit, which is typically inserted in a power supply unit compartment provided on the back surface of the mobile telephone. The card reader unit is typically provided within the mobile telephone underneath the battery pack. Nowadays, typical mobile telephone, e.g. used in a GSM-network, also comprises a system connector for connecting the mobile telephone to other external devices, e.g. a laptop computer.

Typically, when a new mobile telephone providing new or enhanced functionalities has been developed, the mobile telephone is provided with a new (e.g. more modernized) design or outer appearance, in order to distinguish the new mobile telephone from the previous type of mobile telephone, in particular to distinguish the mobile telephone from mobile telephones produced by other manufacturers.

Once the shape and the design of the mobile telephone has been determined by the designer in close collaboration with the engineers which may impose certain restrictions on the outer appearance, e.g. the location of the antenna unit and/or the loudspeaker unit and/or the microphone unit and/or the display unit and/or the requested shape of internal shielding and/or the positioning and arrangement of the keypad (i.e. the switches of the keypad) on the electronic circuit board, the electrical units of the mobile telephone are arranged in order to suit the determined design.

Typically, some electrical units, e.g. the light emitting diodes and/or the loudspeaker unit and/or the microphone unit and/or the display unit, are mechanically connected to a front housing of the mobile telephone, and the charging device coupling socket is mechanically mounted to the back housing of mobile telephone. The printed circuit board is prepared, and then the electrical components respectively arranged in the front and back housing are connected to the printed circuit board through electrical connectors or wirings. Subsequently, the front and back housings are attached at each other by means of fixing screws or by latch means. In this manner, a new mobile telephone is manufactured by requiring many operation steps, and an electrically and mechanically secured connection between the electrical unit (s) in the respective housings and the printed circuit board must be ensured.

Furthermore, since the arrangement of electrical parts like the shielding, the switches, the display, LEDs etc. provided in the front/back housings and on the circuit board as well as the electrical/mechanical connection therebetween can change quite drastically between an old model and a new model, a separate approval of each type of mobile telephone is required. Thus, the development of a new product requires many time-consuming steps and as a result of this the introduction of a new product in the market may be delayed.

In order to provide the mobile telephone with different outer appearances, some manufacturers provide different front housings including the respective electrical units, such as the loudspeaker unit and/or the LEDs, which housings can be clipped to the same printed circuit board. The customer purchases from the dealer the new front housing, and the dealer or the manufacturer will assemble the new front housing with the printed circuit board, in order to connect the electrical units of the front housing to the electrical units on the printed circuit board and/or to the other electrical units provided elsewhere in the back housing.

U.S. Pat. No. 5,768,370 discloses a portable telephone with a housing allowing a user to provide the telephone with a plurality of outer appearances. An overlying cover is removably attachable to a portion of the telephone housing which includes operating buttons and an indicia panel. By exchanging this cover the outer appearance of the telephone can be changed. Within the housing of the telephone the electrical/mechanical units of the telephone are arranged. Since the electrical/mechanical units are specifically adapted to the shape of housing it is not possible to change the overall appearance of the housing expect for the minor portion covered by the replaceable cover.

WO 97/32423 describes an electronic device, in particular a mobile telephone, having a housing in which all electrical/mechanical units of the telephone are housed. The housing has a housing wall with openings for control elements and/or display elements. To the housing of this telephone an external wall element which at least partially covers the housing wall can be connected. This external wall element has openings which are aligned to the openings in the housing such that the control switches and control elements projecting through the housing can be accessed even when said additional external wall element is attached to the housing. Here the additional external wall element is adapted at least in parts to the shape of the housing such that a completely free change of the outer appearance of the telephone is not possible. Furthermore, only the front appearance of the telephone can be changed, since the external wall element can only be attached to the housing at the front and the shape of the housing comprising the function of shielding at the back side can not be changed.

U.S. Pat. No. 5,146,615 describes a mobile telephone comprising a housing including a front cover and a plurality of interchangeable control panels for selective alternative attachment to the front cover. A circuit board is provided on which a keyboard with a plurality of switches is arranged, said switches comprising an arrangement of two meander-like conductors which are interdigitally arranged. A rubber keypad is arranged between said circuit board and said front cover. By using different front covers respectively having a different numbers of holes for the rubber keypad switches and by using different rubber keypads the outer appearance of the mobile telephone is changed in the portion where the keypad is arranged. However, the position of the rubber keypad switches can not be altered since there is a fixed positional allocation of the rubber keypad switches to the switches formed by the meander-type conductors on the circuit board.

U.S. Pat. No. 5,271,056 describes an electromagnetic interference shielding construction in a radio telephone. A mechanically rigid assembly is provided which comprises essentially two printed circuit boards, a display, a keypad and a loudspeaker. Furthermore, a ground foil is part of the mechanically rigid assembly as well as a power supply unit. Some housing units can be directly connected to the mechanically rigid assembly or can enclose the mechanically rigid assembly. One of the two housings forming a shell unit comprises as an electrical unit the antenna of the communication station.

GB 2 107 523 A discloses a multiple membrane switch where a flat-type switch is composed of a first and second conductor pattern arranged in two different planes. The first conductor pattern comprises spiral conductors and the second conductor pattern comprises essentially circular-type conductors. In the center of the second conductor pattern a hole is provided. For such type of large area flat-type switches the special differently shaped conductor patterns allow to reduce a large over-travel, i.e. when the actuator can still travel after the closing of the contacts. That is, in this prior art document the conductor patterns are specially provided in order to keep the contact even if after closing the switch some movement occurs.

As explained above, since the housings in conventional mobile telephones are not only design parts, but also have mechanically rigidly connected electrical parts, like the shielding, the microphone unit and the speaker unit or the LEDs, the assembly flow is not in one direction and requires many assembly steps. Whilst there is some flexibility in this design by exchanging e.g. the front housing, the user must still see the dealer in order to have the mobile telephone reassembled with the new housing. Furthermore, since the housings have rigidly connected to them some electrical units, the front housing can only be used in connection with the specific printed circuit board and the other electrical/ mechanical units arranged in an assembly adapted to the location of the electrical units located in the respective housing. That is, the specific housings with their specific electrical parts can only be used for one type of printed circuit board made by a specific manufacturer for a specific type of mobile telephone.

Furthermore, another reason why the outer appearance can not be changed completely is because there is a fixed allocation of the rubber keypad switches to the switches provided on the electronic circuit board. This is a common problem with all communication stations like a mobile telephone, a fixed network cable telephone or a cableless telephone of a DECT system.

SUMMARY OF THE INVENTION

As explained above, conventional communication stations like mobile telephones require complicated manufacturing steps, require a separate approval for each type of mobile telephone, and do not allow the user to flexibly change the outer appearance of the communication station (mobile telephone).

Therefore, the object of the present invention is to provide a communication station which has a structure which allows a flexible variation of its outer appearance and which can be manufactured easily and cost effectively.

SOLUTION OF THE OBJECT

The object of the invention is solved by a communication station including a power supply unit, a core unit connectable to said power supply unit and constituted by a mechanically rigid assembly of all electrical units of said communication station, and a shell unit which houses said core unit and comprises no electrical units of said communication station.

Thus, by contrast to prior art communication stations, the idea of the present invention is to divide the mobile telephone into one core unit, which comprises all electrical parts including the shielding in a mechanically rigid assembly, a shell unit which encloses the core unit, and a power supply unit. The mechanically rigid assembly essentially constitutes a communication station which is fully functional, if the power supply unit is connected thereto. Thus, the shell unit can have many different designs and can easily be mounted around the core unit even by the user, since no connection of electrical parts is necessary. Since the core unit comprises all electrical parts including the shielding in a mechanically rigid connection, the core unit can be embodied as a fully self-contained unit which can be separately tested i.e. approved for the type approval.

Furthermore, the object of the invention is also solved by a communication station including a power supply unit, a core unit connectable to said power supply unit and a shell unit which houses said core unit, wherein said core unit comprises an electronic circuit board including a keypad unit, said keypad unit comprises a plurality of switches and said switches are formed by at least two spiral-shaped adjacent conductors on said electronic circuit board and bumps being provided on a dome foil of said keypad unit and being adapted to short-circuit the spiral-shaped conductor at different positions.

Thus, not only the outer design of the front housing of the shell unit can be flexibly changed, but also the key layout on the front housing, i.e. the hole layout in the front housing, can be modified. Thus, independently of the constitution of the core unit and the shell unit, a flexible arrangement of the buttons of a keypad and thus of the holes in the front housing of the shell unit can be achieved.

PREFERRED EMBODIMENT OF THE INVENTION

According to one embodiment of the invention, a power supply unit is accommodated in a power supply unit compartment provided in the back housing and connected to the core unit by an electrical connector. The assembly flow is still in one direction, since the core unit can be sandwiched between the front and back housing, and then the power supply unit can be inserted into the compartment and covered with a battery lid.

According to another embodiment of the invention, the core unit comprises the power supply unit compartment, and the power supply unit is accommodated in this compartment, thus also forming a part of the core unit. This type of core unit can again be sandwiched between the front and back housing.

Further advantageous embodiments and improvements of the invention can be taken from the other dependent claims. Hereinafter, the invention will be described with reference to its advantageous embodiments in connection with the accompanying drawings and the following description. It should, however, be noted that the following description only constitutes what is presently considered to be the best mode of the invention, and that further variations and modifications can be carried out on the basis of the teachings contained therein. In particular, the invention can comprise embodiments which consist of features which have been separately described in the description and/or separately claimed in the claims.

Figure 1:
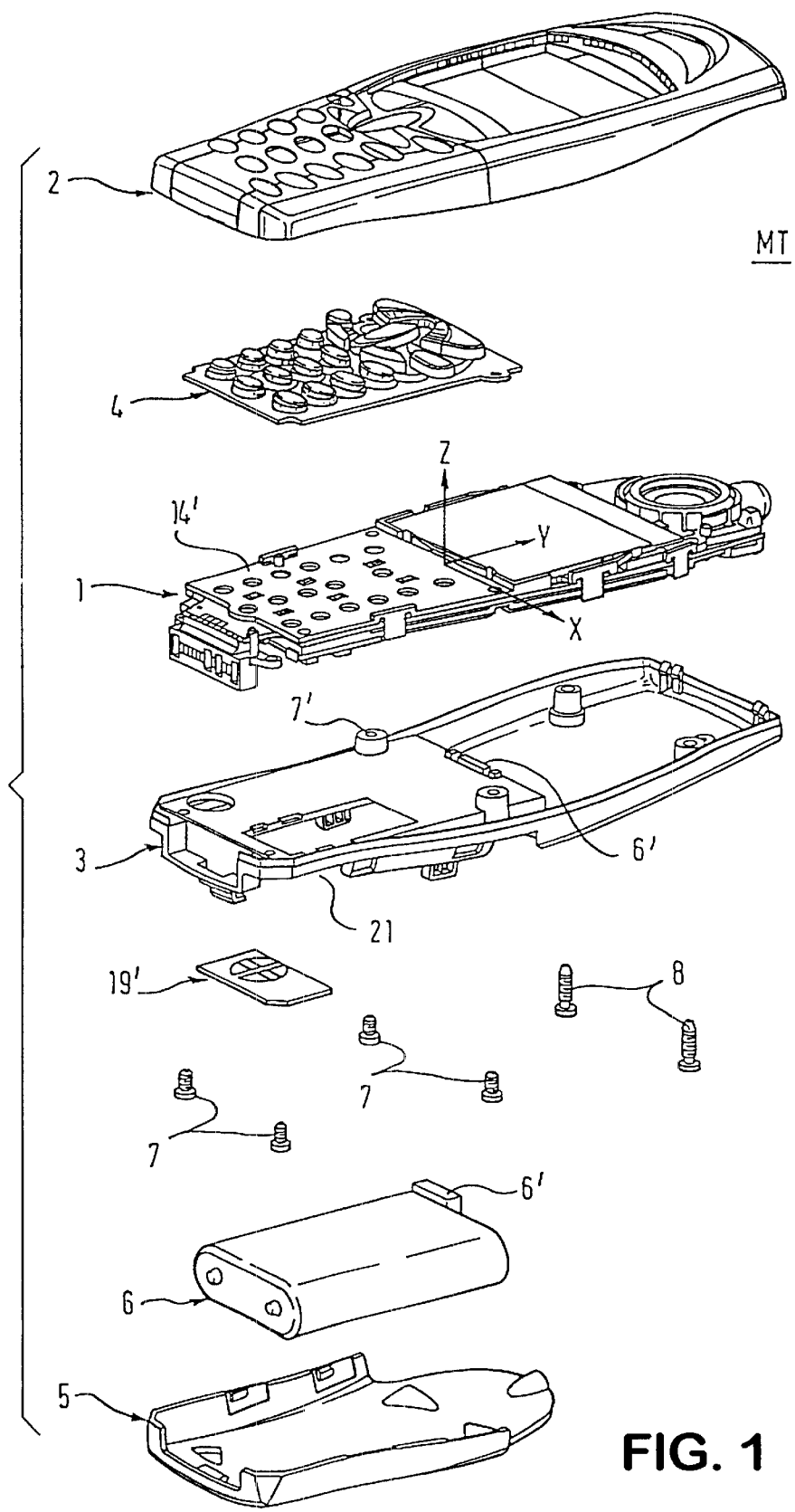
FIG. 1 shows a first embodiment of the mobile telephone according to the invention.

It should be noted that everywhere in the description and in the drawings the same reference numerals designate the same or similar parts throughout. Hereinafter, the basic idea of the invention will be described with reference to a first embodiment where the power supply unit is provided in a rear housing of the mobile telephone. Furthermore it may be noted that hereinafter the invention will be explained with reference to a communication station constituted by a mobile telephone. However, the following explanation equally well applies to cordless telephones, cable telephones or any other types of communication stations connected to a fixed network communication system and/or a mobile radio communication system and/or a DECT system. The invention can also be applied to other types of hand-held or fixed devices e.g. a remote control of a television etc.

First Embodiment

The basic idea of the invention is to provide a communication station (i.e. the mobile telephone) with a construction which can separate the full functionality and the industrial design. That is, independent from the used housing a core or functional skeleton is provided which can undergo testing and type approval completely separately from the design and embodiment of the housing.

As shown in FIG. 1, the communication station (mobile telephone) MT according to the invention comprises a power supply unit 6,6', a core unit 1 connectable to said power supply unit 6,6', and a shell unit 2,3 which houses the core unit 1. The core unit 1 contains all parts for the functionality, so that a type approval of the mobile telephone can be performed by merely the core unit 1 undergoing the type approval alone, i.e. independently from the housings which do not contain any electrical parts. As shown in FIG. 1, the core unit 1 is constituted by a mechanically rigid assembly of all other electrical units of the mobile telephone, except for the power supply unit 6,6', which in the embodiment in FIG. 1 can be inserted into a power supply unit compartment 21 provided in the rear housing 3 of the shell unit. As such, the core unit 1 constitutes a fully functional mobile telephone including a mechanically rigid assembly of all electrical parts which are necessary for carrying out the functionalities of the mobile telephone.

The shell unit comprises a front housing 2 and a back housing 3 and carries no electrical units of the mobile telephone. The power supply unit 6,6' constituted by a battery 6 and a battery connector 6' (making electrical contact between the battery and the core unit) can be attached either to the rear housing 3 or even to the core unit 1 itself, as will be explained with reference to the second embodiment. The shell is, therefore, not combined with any technical functionality necessary for providing a fully functional mobile telephone. In this connection, the power supply unit is not considered as one of the electrical units, which are necessary for providing the functionalities of the mobile telephone. In the first embodiment, as shown in FIG. 1, the power supply unit 6,6' is accommodated in a power supply unit compartment 21 provided in the back housing 3 and is electrically connected to the core unit 1, i.e. to an electrical unit of the core unit, via an electrical connector 6'. The electrical connector 6' provides the electrical connection between the power supply unit and the electrical unit of the core unit. In addition, the electrical connector can also provide the mechanical rigid connection to secure the power supply unit at the housing and/or the core unit. In another embodiment of the invention, the back housing 3 can comprise an integrated power supply unit again electrically connected to the core unit 1 via an electrical connector 6'. That is, in this embodiment the back housing 3 is completely replaced when a new battery is needed.

Independently as to how the power supply unit is constituted and mounted in the mobile telephone, a flexible design by replacing at least the front housing 2 is achieved in FIG. 1. During a manufacturing of the mobile telephone MT, the core unit 1 can be screwed to the back housing 3 by means of non-black colored screws 7 through holes 7'. Also other ways of connecting the core unit to the back housing 3 are possible, e.g. by means of catches or by a snap means. A battery 6' is inserted into the compartment 21 and is then covered with a battery lid 5. A soft keypad 4, preferably made of rubber, which can be considered as belonging to the shell unit since it is a non-electrical unit is inserted between the front housing 2 and the core unit 1 at a position matching the keypad unit of the core unit 1 as will be explained with more detail with reference to FIG. 2. Also other types of keypads can be used for the keypad 4, i.e. the keypad 4 is not necessarily a soft keypad, but it can also be switch button keypad etc.

The front housing 2 and the back housing 3 can be screwed together by means of black colored fixation screws 8. The core unit 1 is sandwiched between the front housing 2 and the back housing 3. As mentioned above, it is also possible to simply snap the core unit 1 into the back housing 3 and then to snap the front housing 2 into the back housing 3. In order to allow the snapping of the individual parts into each other, each respective housing or the core unit is provided with suitable clamps, clips or latches or catches.

Since the mobile telephone according to the invention only comprises a shell unit having a front housing and a back housing and a core unit, it is easily possible to change some of the parts during the operating life of the mobile telephone. Since the shell unit comprises no electrical parts necessary for the function of the mobile telephone in order to perform speech and data communication in a mobile network, the front housing 2 and/or the rear housing 3 can easily be exchanged to a housing having different outer appearance (contour and/or shape). This will allow the manufacturer, the dealer and the user to flexibly change the mobile telephone while retaining the same functionalities provided by the mechanically rigid assembly of all the electrical parts in the core unit 1. New products can thus be developed in shorter time and under lower costs. Once a standard core unit providing the minimum functionalities for the respective mobile communication network has been devised many different types of mobile telephones having different designs can be marketed. A manufacturer can provide a large range of different housings as long as it is guaranteed that they enclose or house the core unit and allow a connection of the power supply unit to the core unit. Therefore, a manufacturer can develop a standard platform or core unit which itself has a type approval and thus the manufacturer can offer a wide range of differently shaped mobile telephones simply by providing a wide range of attachable housings.

The keypad unit 14' of the core unit 1 is normally constituted by a dome foil 14 (to be explained below; cf. FIG. 2) as a push-button switch array or a flexible board with switches. That is, a part of the switches of the keypad is formed by so-called domes (bumps) of the dome foil, wherein a contact is provided on the lower surface of the dome foil and wherein this contact short-circuits the conductor pattern provided as part of the switches on the electronic circuit board. That is, the meander-type conductors on the PCB board are the contacts of the respective switches which are short-circuited by the contact on the lower surface of the dome foil.

Using the intermediary of the soft (rubber) keypad 4 which constitutes no electrical part of the core unit it is even possible to allow a flexible design of the key layout in the front housing within certain limits (i.e. as long as a switch on the PCB-board can be operated). Therefore, the components of the shell unit like the front housing, back housing, keypad and battery lid can differ between the family members having the same standard platform, i.e. core unit. This concept makes it possible to develop new products in a shorter time and under lower costs.

As explained above, the basic idea of the invention is to provide one mechanically rigid standard platform, namely the core unit 1, which includes all electrical units of the mobile telephone including the shielding. It is precisely this mechanically rigid assembly which allows to renew only mechanical parts like the housings to change the outer appearance of the mobile telephone while it is not necessary to ensure any electrical connection through wirings or connectors between at least one of the two housings. That is, even if the power supply unit 6 and its electrical connector 6' were to be regarded as part of the electrical units, then this power supply unit will only be part of one of the two housings such that at least the front housing 2 has no electrical parts and can be flexibly exchanged.

In the second embodiment, independently as to whether the power supply unit is considered to be an electrical unit of the mobile telephone or not, it is anyway connected rigidly or non-rigidly with the core unit. In this case, as will be explained below, since here the back housing not even comprises the power supply unit, both housings can be flexibly exchanged independently of the battery.

Example of the Core Unit

Figure 2:
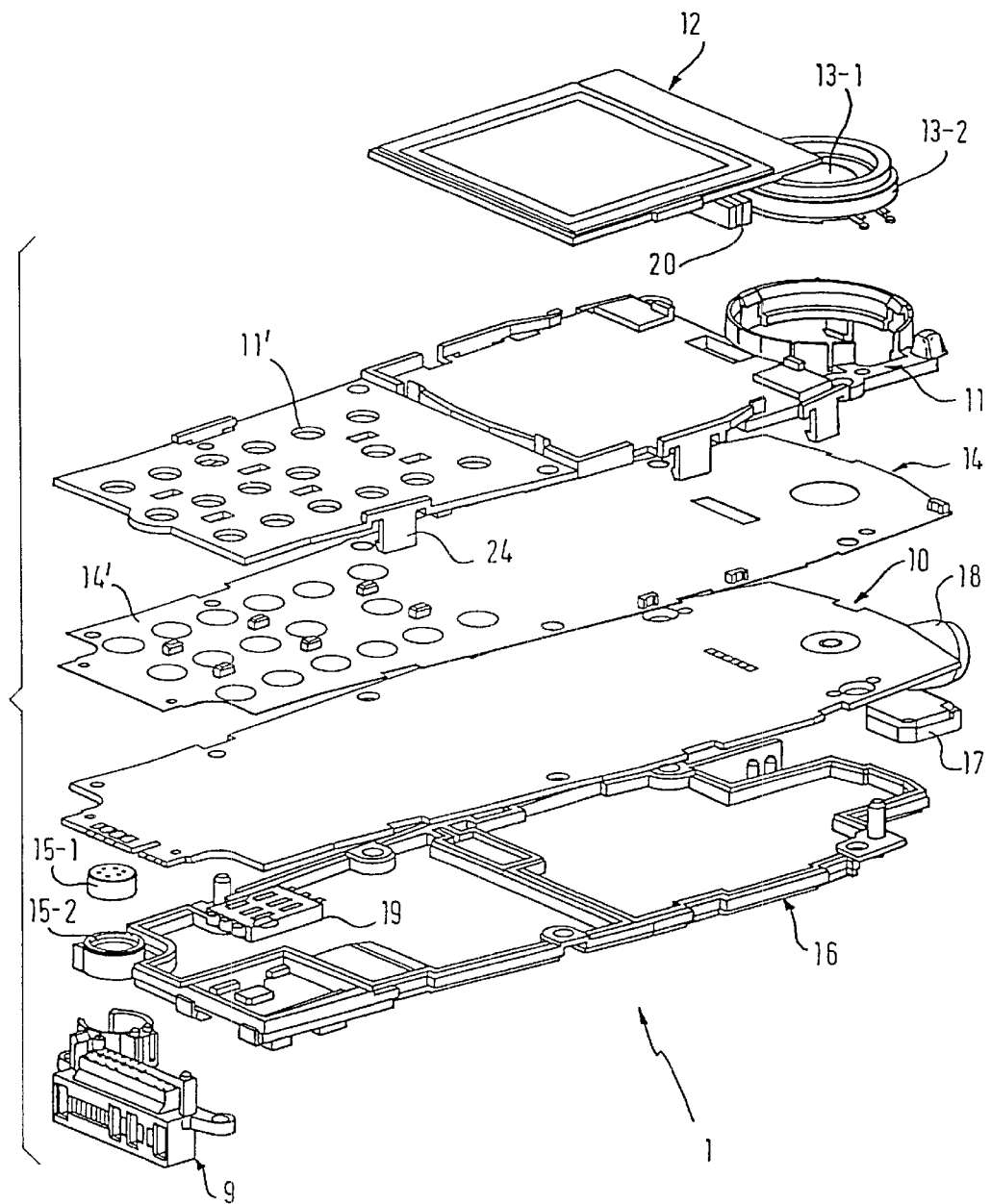
FIG. 2 shows an example of the constitution of a core unit used in FIG. 1.

As explained above, the core unit 1 provides all functionalities, i.e. all electrical units necessary to provide a fully functional mobile telephone which can undergo a type approval completely separately from the housing having different designs. The mechanically rigid assembly comprises, as shown in FIG. 2, a mechanically rigid connection of at least an electronic circuit board 10, for example a printed circuit board PCB, a microphone unit 15-1, 15-2, a loudspeaker unit 13-1, 13-2, a keypad unit 14', a display unit 12, 20, an antenna unit 18, 18', a shielding unit (not separately shown in FIG. 2; it can for example be constituted by a shielding box 16 and/or other shielding parts located elsewhere in the core unit) and a card reader unit 19 for accommodating the SIM-card 19' shown in FIG. 1. The aforementioned electronic circuit board and the other units can be screwed together or can be clamped by means of using clips or latches as will be explained below.

As shown in FIG. 1, on one side of the electronic circuit. board PCB, 10, on which an antenna connector 18 of the antenna unit is mounted, a first assembly including a carrier 11 mounting said loudspeaker unit 13-1, 13-2 and said display unit 12, 20, and a dome foil 14 mounting said keypad unit 14' can be provided. The loudspeaker unit comprises a loudspeaker 13-1 and a loudspeaker gasket 13-2 which are received in a holder on the carrier 11. The display unit comprises an LCD-array 12 having a dust gasket and an LCD-rubber connector 20 making electrical contact to the circuit board 10 through electrical connectors. The dome foil 14 is made of polyester and mounts the LEDs which previously had been provided in the front housing in a conventional mobile telephone. Furthermore, on the dome foil or on the printed circuit board the keypad unit 14' comprising a number of push-button switches or a flexible board is provided. The round holes 11' in the carrier 11 are arranged to allow a better guiding of the buttons the soft (rubber) keypad 4 (more specifically, pins of said soft keypad project into these holes).

On the other side of the electronic circuit board PCB, 10 a second assembly is provided, which includes a shielding box 16 mounting said card reader unit 19 and said microphone unit 15-1, 15-2, a system connector 9 and a buzzer 17. As shown in FIG. 2, the microphone unit comprises a microphone 15-1 and a microphone gasket 15-2. The system connector 9 can be screwed or clipped to the shielding box 16. Likewise, the buzzer 17 can either be clipped or screwed to the shielding box or can simply be provided in a recess in the shielding box. The buzzer can also be adhered to the printed circuit board and makes electrical contact with conductors on the rear surface of the printed circuit board. Likewise, also the microphone and the loudspeaker can make electrical connection with the PCB-board through a direct contact or through other electrical connectors.

In FIG. 2 the carrier 11 comprises a latch means 24, i.e. clips, for latching the carrier 11 to the shielding box 16 over said electronic circuit board PCB,10 and said dome foil 14. inserting the LCD array 12 with its LCD rubber connector 20 into the carrier 11 and inserting the loudspeaker 13-1 into the loud speaker gasket 13-2 and attaching the system connector 9 to the shielding box 16 achieves a mechanically rigid connection of all the electrical parts of the mobile station except for the battery, which can be connected to the back surface 3 as shown in FIG. 1.

All other connectors including the system connector 9 and a battery connector are also placed on the core unit, i.e. for example connected to the shielding box and the printed circuit board. Thus, the core unit consisting of the first and second assembly provides a stable construction which allows a separate handling and storage of the core unit, independently of the housings 2, 3.

The units of the core unit 1 shown in FIG. 2 can easily be clamped together allowing an easy manufacturing of the core unit and thus of the mobile telephone MT.

As mentioned above, there exist different possibilities how the front and the back housing can be connected to the core unit. They can simply be arranged in order to enclose the core unit. The front and back housing can for example be screwed together having the core unit 1 sandwiched therebetween. Of course, if the front and back housing is to be connected or clamped to the core unit, one or more units of the core unit, for example the rigid carrier 11 or the rigid PCB-board 10, PCB has corresponding receiving elements for receiving the latches or clamps or clips. In any case, the functionalities of the central platform (core unit) are not affected, since only the front and/or back housing having no electrical units need to be replaced.

Second Embodiment

Figure 3:
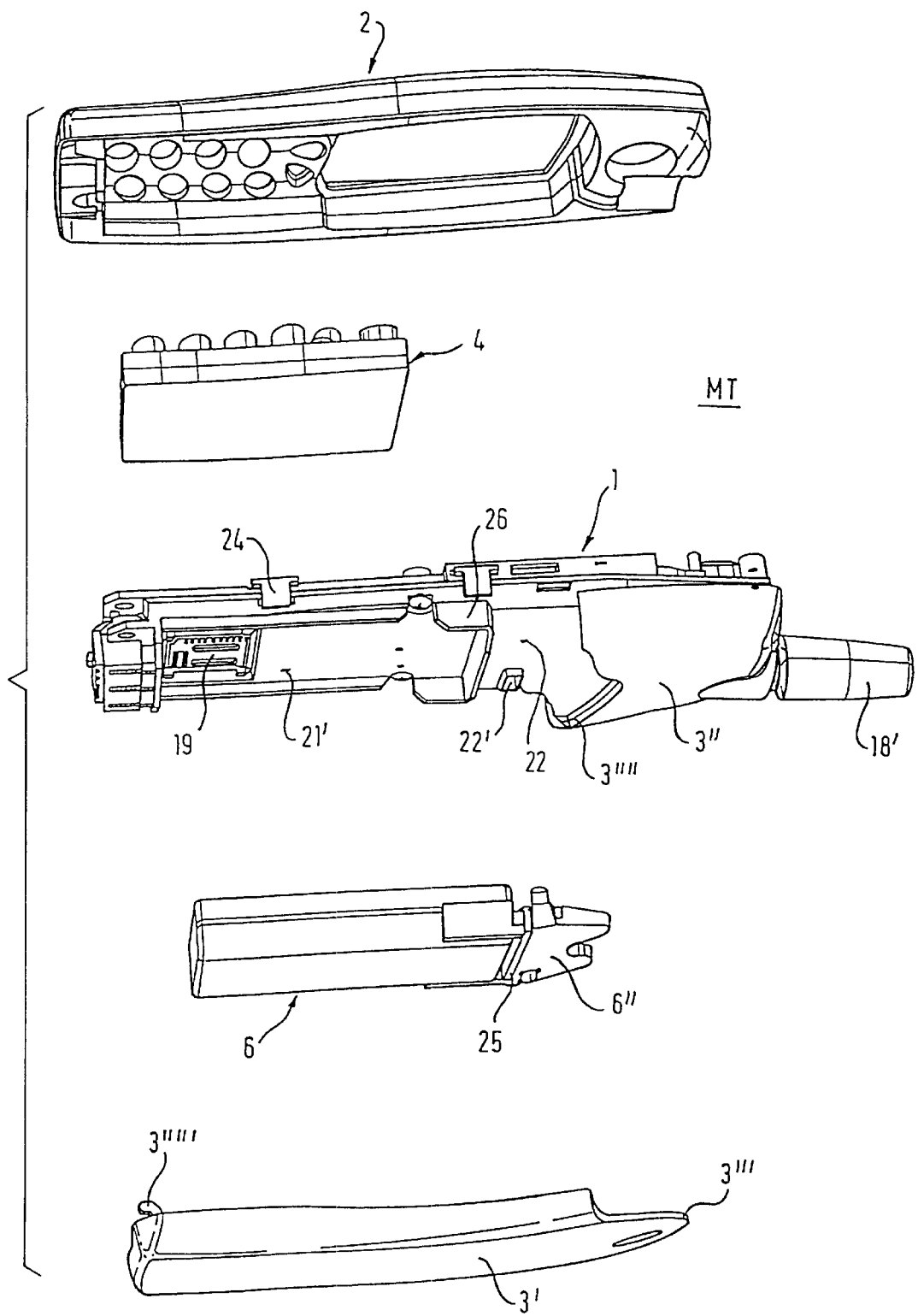
FIG. 3 shows a second embodiment of the mobile telephone according to the invention.
Figure 4:
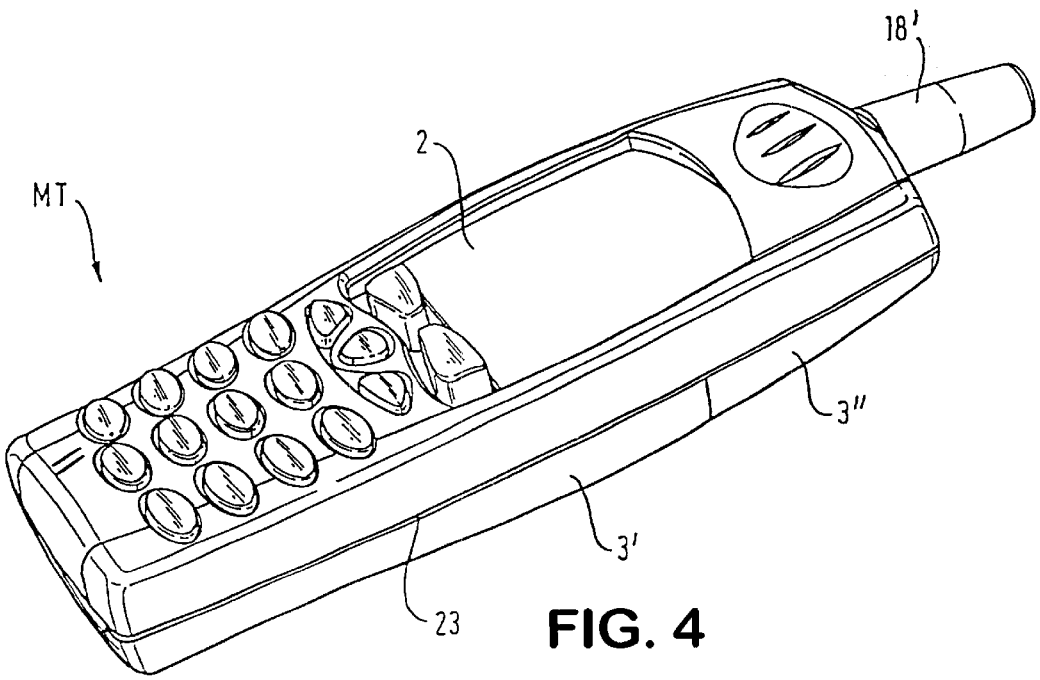
FIG. 4 shows a three-dimensional view of the mobile telephone according to the second embodiment, in particular showing the front appearance of the mobile telephone.
Figure 5:
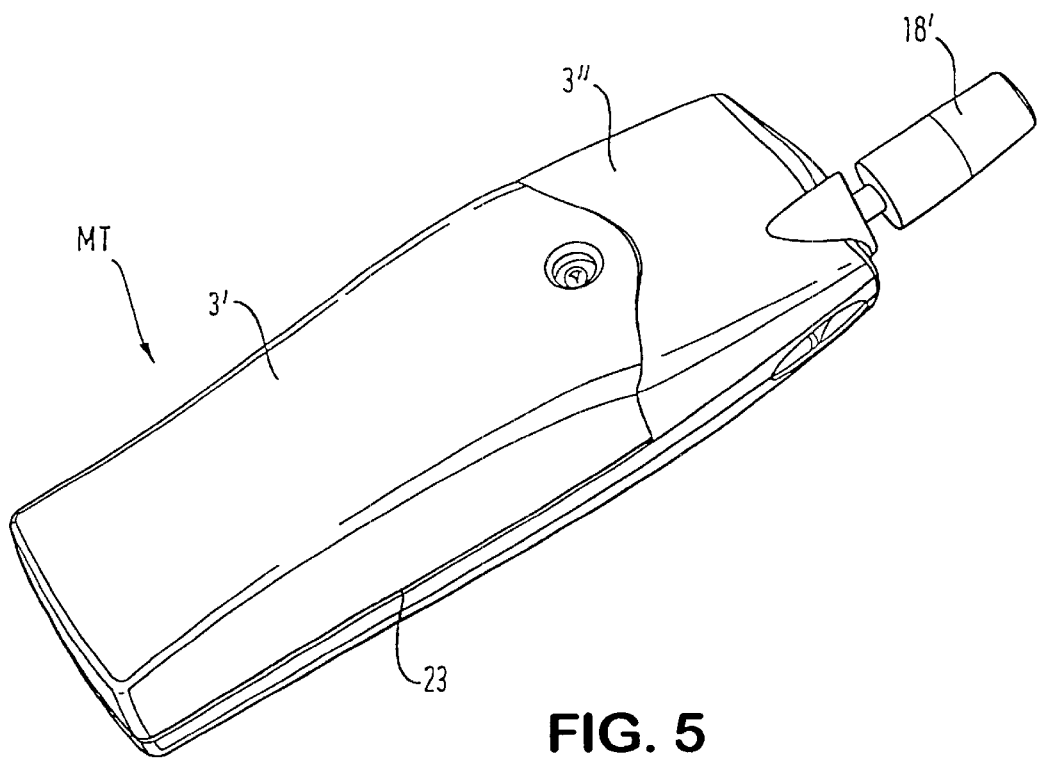
FIG. 5 shows the rear appearance of the mobile telephone shown in FIG. 4.

In the above-described embodiment, the power supply unit 6, 6' is provided in the compartment 21 of the rear housing 3, FIGS. 3–5 shows another embodiment of the present invention, where the power supply unit is accommodated in a power supply unit compartment 21', which itself is part of the core unit 1.

The compartment 21' can be provided as a further layer of the core unit 1 shown in FIG. 2. As indicated with the latch means 24, the latch means 24 can also clamp the additional compartment unit 21'. The compartment 21' is provided with a recess in order to allow access to the card reader 19.

The power supply unit 6, 6" comprises a battery pack 6 and a mounting means 6" connected to the battery pack 6 for mounting said power supply unit 6, 6" to said core unit 1, more precisely to the compartment 21'. As shown in FIG. 3, the back surface of the compartment unit 21' can comprise a section 22 having a recess 22' into which the mounting means 6" of the power supply unit can be inserted. The mounting means 6" is a flexible or rotatable joint 25. Thus, the power supply unit can be placed on the compartment 21' and the joint 25 is provided on the frame 26 whilst the mounting means 6", i.e. its clips are inserted into the recess 22'. The power supply unit also comprises an electrical connector (not shown), which engages an electrical connector (not shown) in the compartment 21' in order to supply energy to the electrical units of the core unit 1. When the battery pack 6' has been inserted in the compartment 21' and has been clamped to the rear surface via the mounting means 6", the battery pack 6 can be lifted or rotated in order to allow an access to the card reader unit 19, lying underneath the battery 6 in its mounted state in the embodiment in FIG. 3. However, as long as the card reader unit is somehow accessible from the outside, it is also possible to simply insert the battery pack 6 into the compartment and fix it there by means of a rigid connection not allowing any pivotal or rotational movement. One example is that the battery pack 6 does not cover the card reader. In another example the card reader lies underneath the battery pack, however, the user inserts the card before attaching the battery pack.

When the battery pack and its mounting means have been attached to the rear surface of the compartment 21' and the section 22, then this kind of core unit is provided with a front housing and the back housing together with the soft (e.g. rubber) keypad 4 already explained with reference to FIG. 1. In this case, the back housing can cover the inserted power supply unit accommodated in the power supply unit compartment and the parts of the core unit 1 not covered by said power supply unit (or its mounting means). That is, in this case simply a back housing is attached to the core unit after the battery pack has been inserted.

FIG. 3 further shows another embodiment of the invention where the core unit in addition to the compartment 21', the section 22 and the recess 22' comprises a mounting part 3" which covers the parts of the core unit 1 which are not covered by the inserted power supply unit 6, 6". The mounting part 3" can have a specific contour and shape to form a continuous surface, once the back housing 3" has been attached to the core unit. The mounting part 3" could e.g. be configured in a standard fashion which reflects a corporate identity of the manufacturer. Thus, any core unit having such a mounting part can be identified as belonging to a specific company. Special features which allow an identification can be provided also within the mounting part.

The mounting part 3" can also be used for accommodating the antenna unit 18, 18' (mounted to the circuit board in FIG. 2) since the mounting part 3" can be configured as a rather solid block which allows to carry the weight of the antenna 18' when it is extended.

In this case, the attachment of the front housing 2 together with the soft keypad 4 is the same as explained before.

However, a particularly preferred embodiment of the invention comprises a slot 3"" within the mounting part 3" for inserting a tongue 3''' of the back housing 3'. The tongue is inserted into the slot provided in said mounting part and a latch 3''''' is provided on the back housing 3' to be snapped into a recess in the core unit 1. Advantageously, the shape of the mounting part 3" and the shape of the back housing 3' and the front housing 2 have a continue surface as is illustrated in FIG. 4, FIG. 5. Here, due to the matched surfaces, there is always formed a continuous contour 23, whereby the back surface of the mobile telephone MT is formed as a continuous surface by the back housing 3' and the mounting part 3". The mounting part 3" which forms a portion of the back surface of the mobile telephone can have an arbitrary shape and can still allow specific different designs of the back housing 3' together with the front housing 2, since also in the second embodiment shown in FIG. 3 no electrical parts are provided in the back housing 3' and the front housing 2. Reference numeral 18' shown in FIG. 3 and FIG. 5 denote the antenna of the mobile telephone MT which is connected to the antenna connector 18 mounted on the printed circuit board.

The continuous surface between the back housing 3' and the mounting part 3" can be achieved by matching their shapes at the interface, whilst otherwise the shape of the back housing 3' can be designed freely. Therefore, also the embodiment shown in FIGS. 3–5 achieves the same advantages as described above in FIG. 1, 2. Also in FIG. 3 the core unit 1 provides a mechanically rigid connection of all electrical parts of the mobile telephone together with mechanical parts necessary for achieving the mechanically rigid connection. Thus, the core unit 1 provides the basic skeleton or core and different housings can be attached to the core unit to alter the outer appearance of the mobile telephone, whilst the core unit 1 will be maintained as it is.

Third Embodiment

As already explained above with respect to the communication station (mobile telephone) MT in FIG. 1, the communication station includes the power supply unit, a core unit connectable to said power supply unit and a shell unit which houses said core unit 1. The core unit 1 comprises an electronic circuit board PCB, 10 and a dome foil 14 including a keypad unit 14'. A soft keypad 4, e.g. made of rubber, is used an intermediary and this soft keypad comprises some buttons which extend through holes provided in the shell unit, more particularly in the front housing 2. However, it is also possible that the switches are directly provided on the electronic circuit board or on the dome foil and directly extend through the holes in the front housing 2 without the intermediary of the soft keypad 4. As explained above, any other type of keypad can be used for the keypad 4.

As explained with respect to U.S. Pat. No. 5,146,615 above, typically the switches provided on the electronic circuit board PCB, 10 comprise two conductors which are interdigitally arranged in a meander-shape. However, with such a configuration of the switches the positioning of the keypad buttons on the soft keypad 4 can not be made flexible, since a depression of the buttons must depress the buttons on the dome foil and these must short circuit the two conductors at a specific position of the meander-shape. That is, the buttons of the soft (rubber) keypad and thus the holes in the front housing 2 through which the soft keypad buttons extend, can not be flexibly designed, since if the location of the soft keypad buttons is changed, a short circuit of the two conductors may not be possible depending on the dislocation. That is, a depression of the buttons on the dome foil does not lead to a short circuit of the conductors anymore.

Figure 6A:
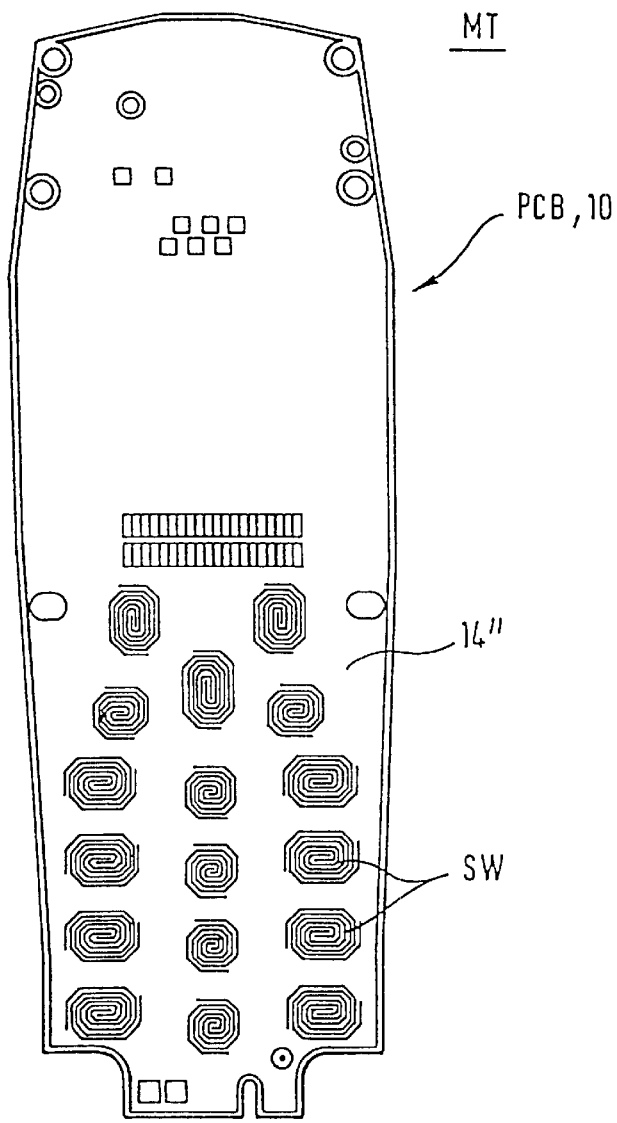
FIG. 6 a circuit board of a communication station including a plurality of oval and round shaped switches for allowing a flexible arrangement of keys on the soft (rubber) keypad and thus on the front housing.
Figure 6B:
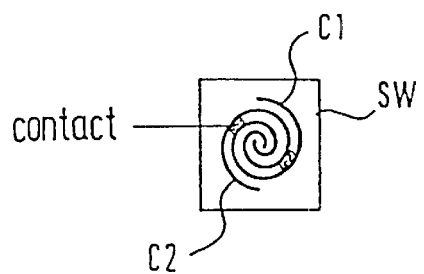

FIG. 6 shows a communication station MT according to another embodiment of the invention. The communication station in FIG. 6 includes a power supply unit, a core unit connectable to the power supply unit and a shell unit which houses the core unit. Although all the specific configurations of the core unit shown in FIGS. 1–5 can be used in the embodiment in the FIG. 6, the embodiment in FIG. 6 does not necessarily comprise the core unit being constituted by the mechanical rigid assembly of all electrical units of the communication station. Likewise, the shell unit does not necessarily have to comprise no electrical units of the communication station.

A special feature of the embodiment in FIG. 6 is the constitution of the electronic circuit board PCB,10 which is part of a core unit. A dome foil (not separately shown in FIG. 6; cf. reference numeral 14 in FIG. 2) includes a keypad unit 14" similarly as in FIG. 2. The electronic circuit board PCB, 10 according to the embodiment in FIG. 6 comprises a plurality of switches SW. In FIG. 6 the switches SW are formed by at least two spiral-shaped adjacent conductors C1, C2 on said electronic circuit board PCB,10. The spiral shape can be oval or round as shown in FIG. 6. Due to the spiral shape of the two conductors C1, C2 a flexible layout of the keypad switches SW, the buttons of the dome foil, the soft keypad 4 and thus of the holes in the front housing 2 can be enabled, since within certain limits (i.e. within the two-dimensional area occupied by the switches) a contact between the two conductors C1, C2 can be made at different positions in the horizontal and vertical direction. Configuring each of the switches on the circuit board in the configuration shown in FIG. 6 allows flexible design of the front housing also with respect to the location of the keys (holes) such that the design flexibility can be increased.

When the switches SW comprise the spiral-type conductors C1, C2 on the circuit board PCB, 10, preferably the dome foil 14 and the carrier 11 are also modified in order to allow the flexible changing of the hole layout in the front housing. For example, each of the buttons of the dome foil having a corresponding contact on the lower surface could be constituted as a plurality of small buttons each having a small corresponding contact on the lower surface. The small contacts are arranged such that they short-circuited the spiral conductors of a respective switch at different positions (see the contact'points in FIG. 6. In this case, the holes 11' in the carrier are also enlarged in order to allow said plurality of little switches to extend therethrough. Thus, even when the key layout in the front housing changes (during a replacement of the front housing) a different set of small buttons will be pressed and they will correspondingly short circuit the two spiral conductors at different positions.

As mentioned afore, the embodiment in FIG. 6 independently allows to increase the designed freedom by using the specially configured switches on the circuit board. Advantageously, the embodiment in FIG. 6 can be used together with the embodiments in FIGS. 1–5.

Fourth Embodiment

Figure 7:
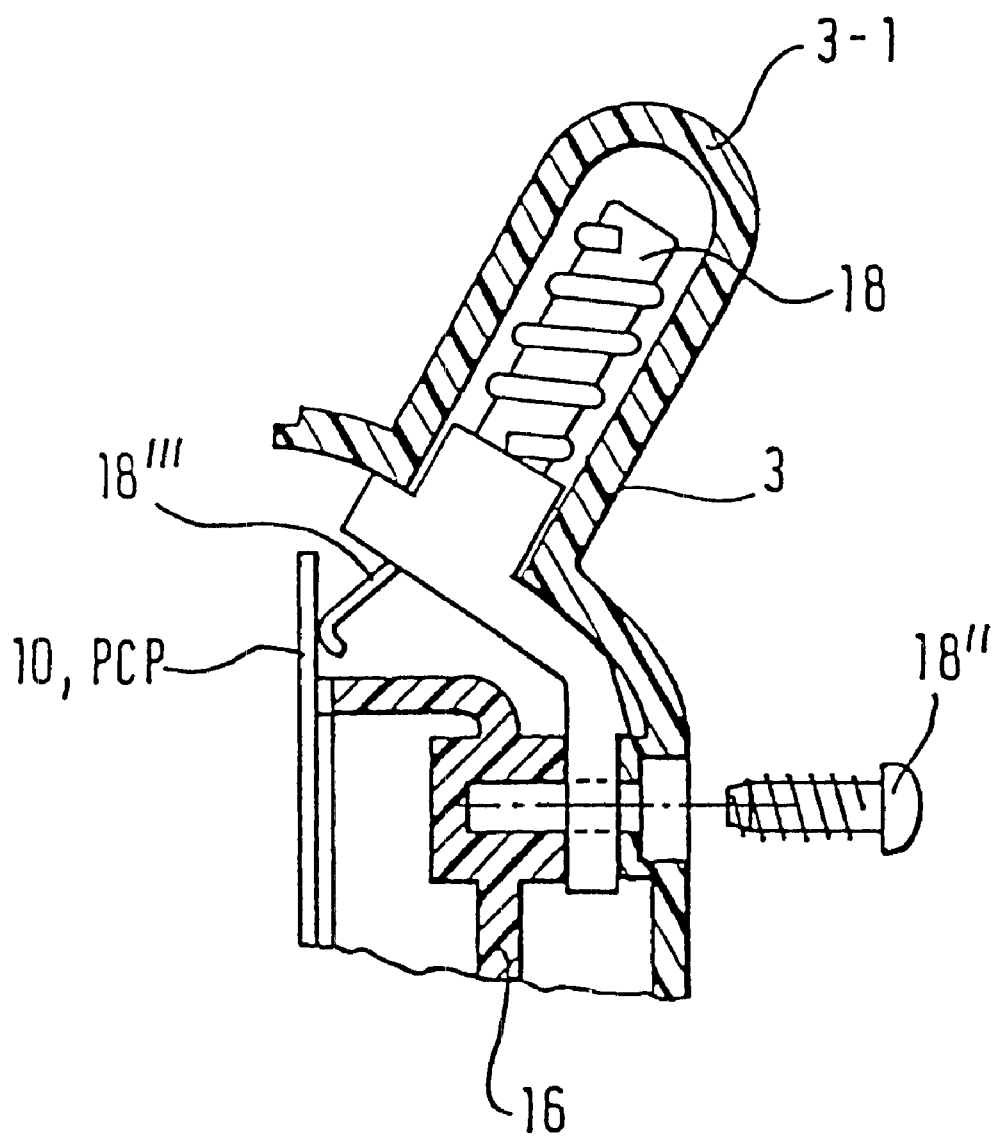
FIG. 7 a further embodiment of the invention in which the complete antenna is integrally formed with the housing.

As explained above in FIG. 3, the antenna unit 18, 18' can be mounted e.g. to the printed circuit board and the antenna is screwed to the antenna socket through a hole provided in the back or front housing. Thus, the antenna is a part projecting from the housing and is subject to mechanical or electrical failure. Furthermore, since additional manufacturing steps and parts are necessary the costs of the whole station is increased. As shown in FIG. 7, it is possible to integrate the antenna e.g. in the back housing, such that it is protected therein. That is, the housing is specifically adapted to accommodate also the antenna unit including all its parts, i.e. the socket and the antenna itself.

A first possibility is that the antenna socket is simply screwed to the PCB board via a PT screw 18" extending e.g. through the back housing and being screwed into the PCB board. In the case the back housing has a special configuration, i.e. as shown in FIG. 7, a projecting housing part 3-1. Reference numeral 18''' denotes a contact for electrically connecting said antenna to said circuit board. However, it is also possible to accommodate the antenna completely in the housing having a configuration as shown e.g. in FIG. 1 or FIG. 3.

Another second possibility is that the mounting part 3" and the antenna unit 18' as shown in FIG. 3 are integrally formed, i.e. as one part whereas the back housing has the configuration as already shown in FIG. 3. Also in this case the antenna 18' is connected to the circuit board via a suitable electrical contact. In the second possibility it is possible to again provide the core unit with all electrical units in a-mechanical rigid assembly.

By accommodating the antenna in the housing (either as shown in FIG. 7 or as an integral part of the mounting part 3" and the antenna unit 18' in FIG. 3) the following advantages are achieved. When the mobile telephone drops or is otherwise subjected to strong external forces, such forces need not be accommodated by the antenna but by the housing itself. The station itself remains intact and the functions thereof are retained. When mounting the antenna inside the housing one conventional part needed for the mounting of the antenna can be disposed with. Preferably, the antenna unit is a single integral part comprising the antenna socket and the antenna itself, i.e. without any screwing or fixing parts between them (see FIG. 3).

Fifth Embodiment

Figure 8:
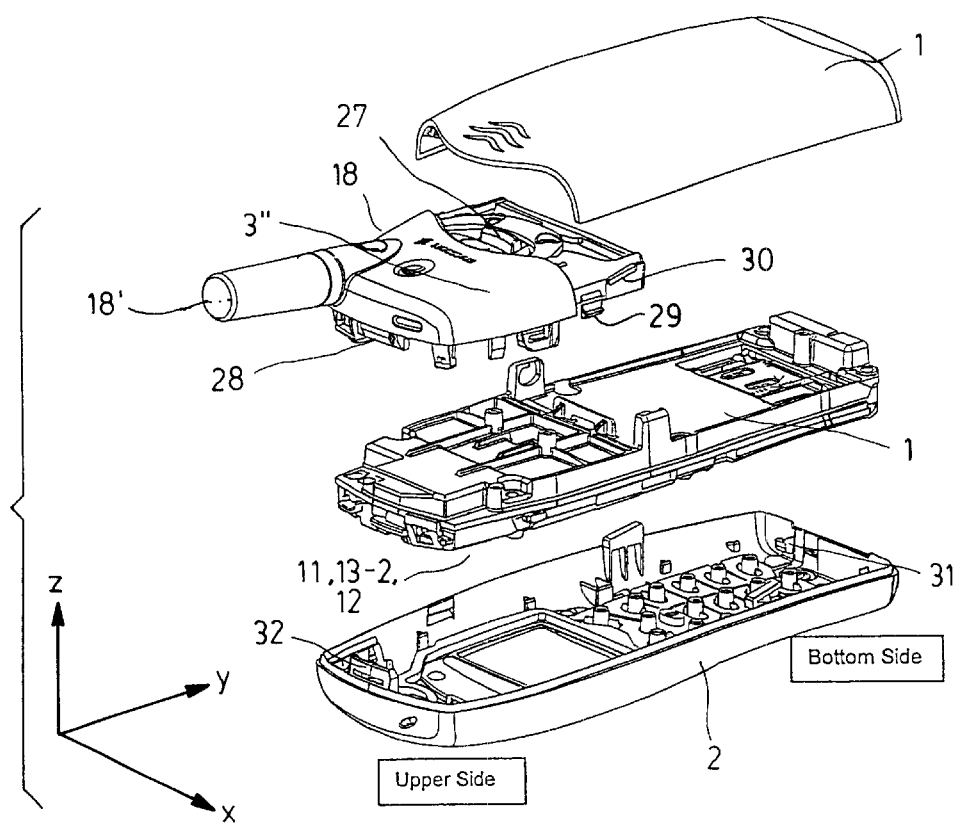
FIG. 8 a further embodiment of the mobile telephone in accordance with the invention, also using a mounting part 3" as in the embodiment in FIG. 3.

With reference to FIG. 3 it was already described above that the core unit 1 can in addition to the compartment 21', the section 22 and a recess 22' comprise a mounting part 3" which covers the parts of the core unit 1 which are not covered by an inserted power supply unit 6, 6". In particular, as shown in FIG. 5, the mounting part 3" forms a continuous surface with the back housing 3'. FIG. 8 shows a further embodiment of the usage of a mounting part 3" similarly as in FIG. 3. The mounting part 3" carries the antenna unit 18, 18' and can be snapped into the core unit 1 to form the mechanically rigid assembly comprising all electrical parts of the mobile telephone, similarly as in FIG. 3. A back housing 3' and a front housing 2 having an upper side and a bottom side are provided, again similarly as in FIG. 3. The core unit 1 itself has a constitution as in FIG. 2, e.g. comprising a carrier 11 and an acoustic (loudspeaker) gasket 13-2 and a dust gasket for the LCD array 12. Also in FIG. 8 the back housing 3' forms—after being mounted to the mounting part 3"—a continuous surface therewith.

For assembling the core unit 1, the mounting part 3", the back housing 3' and the front housing 2, a slider including on one side a release button 27 and on another side a top gap 28, a soft snap hook 29, some features for the back housing fixation 30, a stop rib and a bottom gap 31, a top hook 32 and a fixating hook (not shown) on the core unit 1 are provided. The individual parts are assembled as follows.

In a first step the carrier 11 (see FIG. 2) as a part of the core unit 1 defines the correct position in all three directions of the mounting part 3". The mounting part 3" is snapped and screwed into the core unit 1 by means of a latching means (e.g. a hook) provided on each side of the mounting part 3". When the mounting part 3" is snapped into the core unit 1 it forms the mechanically rigid assembly comprising all electrical parts.

In a second step, the front housing 2 is mounted to the core unit 1 by a fixing hook (not shown) on the bottom side of the core unit 1 in the bottom gap 31 provided on the bottom side of the front housing 2 under a relative angle to the core unit 1. Of course, also the alternative arrangement is possible, where the hook is provided on the front housing 2 and the bottom gap 31 is provided on the core unit 1. In this second step, the front housing 2 is only fixed on the bottom side by means of the hooks and then in a third step the upper side of the front housing 2 is rotated towards the upper side of the core unit 1 such that the top hook 31 of the front housing 2 will first meet the mounting part 3" and then the top gap 28 of the slider. This top gap 28 is a part of the slider integrated in the mounting part 3" and can be moved relative to the mounting part 3" (e.g. movable in the Y-direction, wherein the mounting part 3" and the slider can be connected by a spring). The top hook 32 snaps into a top gap 28 of the slider. When the top hook 32 is thus snapped into this top gap 2B of the slider, the front housing is firmly pressed against the acoustic and dust gaskets of the core unit 1. The mounting part 3" and also the top gap 28 of the slider define the correct position of the front housing 2 in the lateral X and Y directions. Of course, the alternative arrangement where the hook is provided on the slider and the gap is provided on the upper side of the front housing 2 is possible.

When the front housing 2 is mounted to the core unit 1 at the bottom side some additional ribs at the side of the front housing 2 can work as a stop. When the front housing 2 is rotated to the core unit i to be assembled together with it also the soft snap hooks 29 provided on the already mounting part 3" allow a firm latching of the front housing 2 and the mounting part 3". The stop ribs 31 on the gaps of the front housing 2 from the bottom side prevent that the front housing is first connected at the upper side and then on the bottom side, i.e. the mounting of the front housing 2 will always have to start by inserting the bottom side of the front housing into the core unit 1 and fixing it with the hooks.

Although not shown in FIG. 8, a release button 27 and the top gap 28 which are parts of a slider is movable in the Y-direction. When the release button 27 is pulled in the positive Y-direction, the top hook 32 will be released from the top gap 28 and thus the front housing 2 can be replaced. Since the slider is pulled against the force of the spring, the top gap 28 will move back to its normal position after the front housing 2 has been removed.

Finally, after the mounting part 3" and the front housing 2 have been mounted at the core unit 1, the last and fourth step is the mounting of the back housing 3' to the assembly obtained so far, for example at the mounting part 3" of the core unit 1 and/or at the front housing 2. For this purpose at the side of the mounting 3" and the front housing 2 there are some features which fix the back housing 3' on the assembly. The back housing 3' is thus slided with a guiding rail onto these features. As shown in FIG. 8, some features for back housing fixation 30 are provided on the mounting part 3" and thus the back housing 3" can be fixed to the mounting part 3", e.g. by first sliding the back housing 3' on the guiding rail (not shown) and then the housing is also fixed at the bottom side of the core unit 1 by some means. Of course also the mounting example in FIG. 3 can be used for the back housing 3', namely with a tongue 3'" and a hook 5'.

As can be seen from FIG. 8, after having mounted the mounting part 3" with the core unit 1, a mechanically rigid assembly is formed including all electrical parts (except the battery). By means of the fixation means 27–32 the front housing as well as the back housing 3' can quickly and easily be exchanged to a different type of front housing and back housing. The only requirement is of course that the back housing 3' and the front housing 2 and the mounting part 3' form a continuous and smooth surface for better appearance. However, since the mechanically rigid assembly comprises all electrical parts, only parts which contribute to the outer appearance of the mobile telephone can be exchanged.

Industrial Applicability

As explained above, if the housing contains no electrical units and the core unit comprises all electrical units of the mobile telephone, possibly together with the power supply unit as shown in FIG. 3, then a definite mounting of the housings at the core can be achieved by means of additional fixing means, for example screws or clamps. In this case, the different versions of the mobile telephone having different outer appearances can be produced in the factory during the final manufacturing stage.

On the other hand, if the mobile telephone is devised such that the front housing and the back housing are clamped together simply holding the core unit sandwiched therebetween, this also allows a dealer to make a specific mobile telephone according to the customer's wish by putting together different versions of front and back housings with the core unit. The making of variations is extremely simple and can be performed in very short time at low cost. A dealer can store a great plurality of different housings and can immediately make mobile telephones having the same core unit (i.e. technical specification) but different outer appearances.

Instead of providing the keypad 4 on the printed circuit board or on the carrier or on the dome foil, it is also possible to snap the complete keypad 4 comprising the keypad unit 14 onto the carrier 11. Thus, a keypad unit 4 having snap means like the other parts of the core unit allows an extremely easy mounting of the individual parts of the core unit 1 to form a rigid assembly as for example shown in FIG. 1.

The making of such variations of the mobile telephone by providing a great plurality of different housings with no electrical parts together with a core unit providing all electrical parts of the mobile telephone can be used for any communication station e.g. a mobile station of a mobile radio communication network. It can also be applied to car telephones or fixed network telephones where instead of the antenna unit 18, 18' an output port for a connection cable may be connected. Thus, the invention is not restricted to any specific type of telephone or communication station.

Furthermore, the invention is not restricted to the specific embodiments and examples described in the present application. That is, on the basis of the teachings contained in the description, various modifications and variations of the invention may be carried out. The scope of the invention is defined by the attached claims and reference numerals in these claims are only used for illustration purposes and do not limit the scope of protection.

What is claimed is:

1. A communication station comprising:
   a power supply unit,
   a core unit connectable to the power supply unit and including a mechanically rigid assembly of all electrical units of the communication station, and
   a shell unit which houses the core unit and includes no electrical units of the communication station,
   wherein the mechanically rigid assembly comprises a mechanically rigid connection of at least an electronic circuit board, a microphone unit, a loudspeaker unit, a keypad unit, a display unit, an antenna unit, a shielding unit and a card reader unit, and
   wherein the mechanically rigid assembly comprises a) on one side of the electronic circuit board mounting the antenna unit a first assembly including a carrier mounting the loudspeaker unit and the display unit, and a dome foil mounting the keypad unit, and b) on the other side of the electric printed circuit board a second assembly including a shielding box mounting the card reader unit and the microphone unit, a system connector and a buzzer; wherein the carrier comprises latch means for latching the carrier to the shielding box over the electronic circuit board and the dome foil.

2. A communication station according to claim 1, wherein
   the antenna unit comprises an antenna connector connected to the electronic circuit board;
   the dome foil includes at least one light emitting diode;
   the loudspeaker unit includes a loudspeaker and a loudspeaker gasket;
   the display unit comprises an LCD array having a dust gasket and an LCD rubber connector;
   the system connector is connected to the shielding box via fixing screws or latch means; and
   the microphone unit comprises a microphone and a microphone gasket.

3. A communication station comprising:
   a power supply unit,
   a core unit connectable to the power supply unit and including a mechanically rigid assembly of all electrical units of the communication station, and
   a shell unit which houses the core unit and includes no electrical units of the communication station,
   wherein the mechanically rigid assembly comprises a mechanically rigid connection of at least an electronic circuit board, a microphone unit, a loudspeaker unit, a keypad unit, a display unit, an antenna unit, a shielding unit and a card reader unit, and wherein
   the antenna unit comprises an antenna connector connected to the electronic circuit board;
   the dome foil includes at least one light emitting diode (LED);
   the loudspeaker unit includes a loudspeaker and a loudspeaker-gasket;
   the display unit comprises a liquid crystal display (LCD) having a dust gasket and an LCD rubber connector;
   the system connector is connected to the shielding box via fixing screws or latch means; and
   the microphone unit comprises a microphone and a microphone gasket.

4. A communication station comprising:
   a power supply unit, and
   a core unit connectable to the power supply unit and including a mechanically rigid assembly of all electrical units of the communication station, and a shell unit which houses the core unit and includes no electrical units of the communication station,
   wherein the power supply unit comprises a battery pack and mounting means connected to the battery pack for mounting the power supply unit to the core unit, and
   wherein the connection between the battery pack and the mounting means is a flexible or rotatable joint.

5. A communication station comprising:
   a power supply unit, and
   a core unit connectable to the power supply unit and including a mechanically rigid assembly of all electrical units of the communication station, and a shell unit which houses the core unit and includes no electrical units of the communication station,
   wherein the shell unit comprises a front housing and a back housing having sandwiched therebetween the core unit,
   wherein the back housing covers the power supply unit accommodated in the power supply unit compartment, and wherein the core unit comprises a mounting part covering parts of the core unit not covered by the power supply unit, and
   wherein the back housing comprises a tongue inserted into a slot provided in the mounting part and a latch means snapped into the core unit.

6. A communication station comprising:
   a power supply unit,
   a core unit connectable to the power supply unit and
   a shell unit which houses the core unit, wherein
   the core unit includes an electronic circuit board and a keypad unit,
   the keypad unit comprises a plurality of switches and the switches are formed by at least two spiral-shaped adjacent conductors on the electronic circuit board and
   bumps are provided on a dome foil of the keypad unit and adapted to short-circuit the spiral-shaped adjacent conductors at different positions when the corresponding switches are actuated.

7. A communication station according to claim 6, wherein a keypad is provided between the shell unit and the electronic circuit board.

8. A communication station according to claim 6, wherein the communication station is a mobile station.

9. A communication station according to claim 6, wherein each switch comprises a plurality of small bumps formed in the dome foil, the plurality of small bumps short-circuiting the spiral conductors at the different positions when the corresponding switches are actuated.

10. A communication station according to claim 6, wherein said keypad unit comprises a plurality of push buttons, each push button being constituted by a plurality of small buttons, said plurality of small buttons short-circuiting said spiral conductors at different positions.

11. A communication station comprising:
a power supply unit, and
a core unit connectable to the power supply unit and including a mechanically rigid assembly of all electrical units of the communication station, and a shell unit which houses the core unit and includes no electrical units of the communication station,
wherein the core unit comprises an electronic circuit board and a keypad unit, the keypad unit comprises a plurality of switches and the switches comprise at least two spiral-shaped adjacent conductors on the electronic circuit board, and
wherein the keypad unit comprises a plurality of push buttons, each push button comprising a plurality of small buttons, the plurality of small buttons short-circuiting the spiral conductors at different positions when the push button is actuated.

12. A communication station, comprising:
a power supply unit, and
a core unit connectable to the power supply unit and including a mechanically rigid assembly of all electrical units of the communication station, and a shell unit which houses the core unit and includes no electrical units of the communication station,
wherein the shell unit comprises a front housing and a back housing having sandwiched therebetween the core unit, and
wherein the core unit comprises a mounting part covering the parts of the core unit not covered by the power supply unit, the mounting part comprises a slider having a top gap on one side and a release button on the other side, and the front housing is provided on its upper side with a top hook which in the mounted state is inserted in a top gap of the slider, the front housing being releasable by pulling the release button of the slider and disengaging the to hook of the front housing from the top gap of the slider.

13. A communication station comprising:
a power supply unit,
a core unit connectable to the power supply unit and
a shell unit which houses the core unit, wherein
the core unit includes an electronic circuit board and a keypad unit,
the keypad unit comprises a plurality of switches and the switches are formed by at least two spiral-shaped adjacent conductors on the electronic circuit board and bumps are provided on a dome foil of the keypad unit and adapted to short-circuit the spiral-shaped adjacent conductors at different positions when the corresponding switches are actuated; and
each bump comprises a plurality of small bumps at different positions and at least one of the plurality of small bumps short-circuits the spiral conductors at when the corresponding switch is actuated.

14. A communication station comprising a power supply unit, a core unit connectable to the power supply unit and constituted by a mechanically rigid assembly of all electrical units of the communication station, and a shell unit which houses the core unit and includes no electrical units of the communication station; and the shell unit comprises a front housing and a back housing having sandwiched therebetween the core unit; and the core unit comprises a mounting part covering the parts of the core unit not covered by the power supply unit, wherein the mounting part comprises a slider having a top gap on one side and a release button on the other side, and wherein the front housing is provided on its upper side with a top hook which in the mounted state is inserted in a top gap of the slider, the front housing being releasable by pulling the release button of the slider and disengaging the top hook of the front housing from the top gap of the slider.

15. A communication station comprising:
a) a power supply unit;
b) a core unit connectable to said power supply unit; and
c) a shell unit which houses said core unit; wherein
d) said core unit comprises a mechanically rigid assembly of all electrical units of said communication station;
e) said shell unit comprises no electrical units of said communication station;
f) said core unit comprises a power supply unit compartment and said power supply unit is accommodated in said compartment;
g) said power supply unit comprises a battery pack and a means connected to said battery pack for mounting said power supply unit to said core unit;
h) said shell unit comprising a front housing and a back housing having sandwiched therebetween said core unit; and
i) said back housing covers said power supply unit accommodated in said power supply unit compartment, wherein said core unit comprises a mounting part covering the parts of said core unit not covered by said power supply unit.

16. A communication station according to claim 15, wherein
the mechanically rigid assembly comprises a mechanically rigid connection of at least an electronic circuit board, a microphone unit, a loudspeaker unit, a keypad unit, a display unit, an antenna unit, a shielding unit and a card reader unit.

17. A communication station according to claim 16, further comprising a keypad, wherein
the keypad is positioned between the front housing and the keypad unit of the core unit.

18. A communication station according to claim 16, wherein said keypad unit comprises a plurality of switches and said switches comprise at least two spiral-shaped adjacent conductors on the electronic circuit board.

19. A communication station according to claim 18, wherein said keypad unit comprises a plurality of push buttons, each push button being constituted by a plurality of small buttons, said plurality of small buttons short-circuiting said spiral conductors at different positions.

20. A communication station according to claim 16, wherein an antenna of said antenna unit is an integral part of said mounting part.

21. A communication station according to claim 20, said antenna unit is screwed to said circuit board.

22. A communication station according to claim 15, wherein the communication station is a mobile station.

23. A communication station according to claim 15, wherein said front housing is snapped into said core unit.

24. A communication station according to claim 15, wherein said back housing is snapped into said core unit.

25. A communication station according to claim 15, wherein said front housing, said back housing and said mounting part form a continuous surface.

* * * * *